R. G. SANFORD.
COMBINED ODOMETER AND SPEEDOMETER.
APPLICATION FILED APR. 28, 1908.
919,776.
Patented Apr. 27, 1909.
2 SHEETS—SHEET 1.
Fig. 1
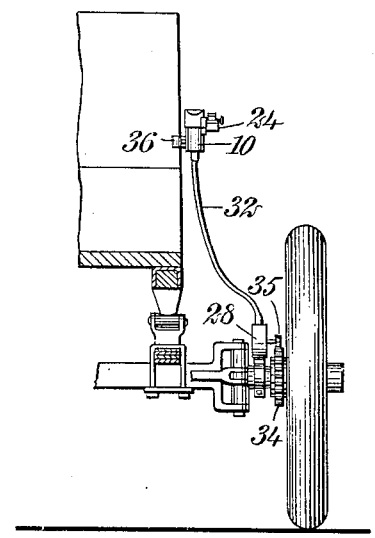
Fig. 2
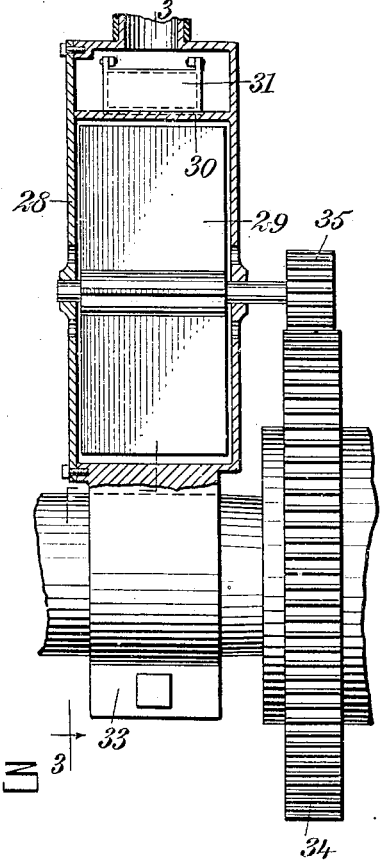
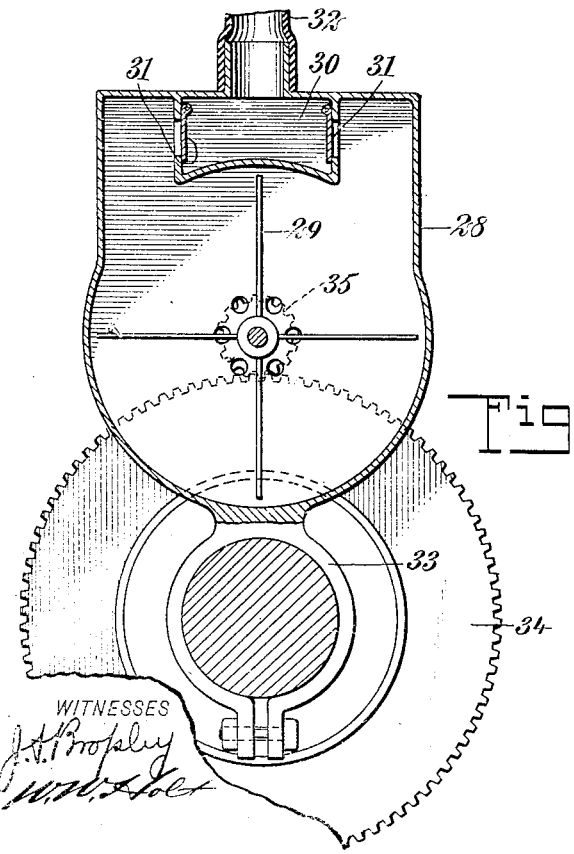
Fig. 3
WITNESSES
INVENTOR
Robert G. Sanford
BY
ATTORNEYS

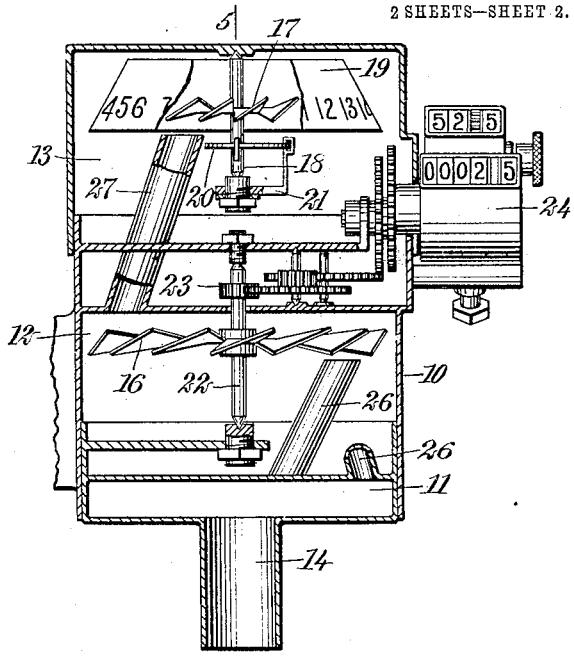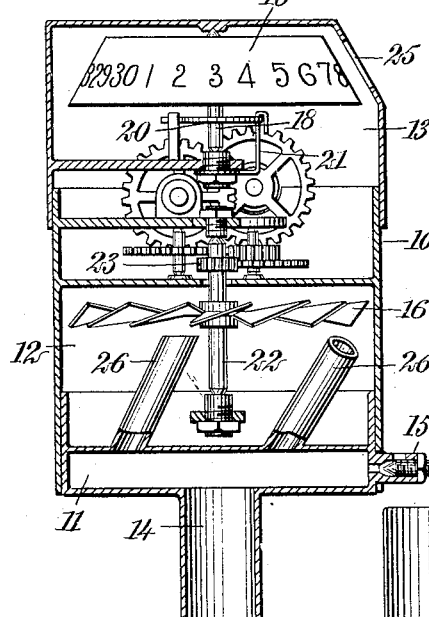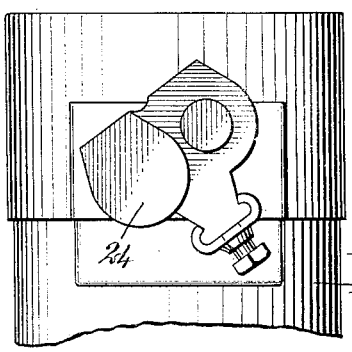

UNITED STATES PATENT OFFICE.

ROBERT G. SANFORD, OF YONKERS, NEW YORK.

COMBINED ODOMETER AND SPEEDOMETER.

No. 919,776.

Specification of Letters Patent.

Patented April 27, 1909.

Application filed April 28, 1908. Serial No. 429,640.

*To all whom it may concern:*

Be it known that I, ROBERT G. SANFORD, a citizen of the United States, and a resident of Yonkers, in the county of Westchester and State of New York, have invented a new and Improved Combined Odometer and Speedometer, of which the following is a full, clear, and exact description.

This invention is an improvement in meters for registering the number of revolutions and the rate of travel of shafts at any particular instant, and belongs to that class of such devices which are actuated by a current of air generated from the moving part of which the measurement is taken.

The invention has for its purpose to provide for the actuation of the measuring means in the same direction, irrespective of the direction of movement of the part measured; to dispense with the usual flexible shaft such as is employed when the meter is applied to a vehicle, and in general, to provide a comparatively simple construction having little or no tendency to vibrate.

The invention further contemplates the combining of an odometer with a speedometer, each having an actuating windwheel with means for delivering a current of air from one wheel to another.

Reference is to be had to the accompanying drawings forming a part of this specification, in which similar characters of reference indicate corresponding parts in all the views.

Figure 1 is a fragmentary sectional view of a vehicle with my improved meter applied thereto; Fig. 2 is a vertical central section through the casing of the blower, illustrating the manner in which it is driven from the vehicle axle; Fig. 3 is a section substantially on the line 3—3 of Fig. 2; Fig. 4 is a central vertical section through the meter; Fig. 5 is a section substantially on the line 5—5 of Fig. 4; Fig. 6 is a cross-section through the meter just above the odometer; and Fig. 7 is a fragmentary side elevation of the upper portion of the meter.

The preferred embodiment of the invention includes in its construction a meter casing 10 divided into three chambers or compartments, 11, 12 and 13, respectively, the lower compartment 11 serving as an air chamber and having an inlet 14 and a regulating valve 15, the intermediate compartment 12 having a windwheel 16, by which the odometer is actuated, and the upper compartment 13 containing the speedometer, the same comprising an actuating windwheel 17 attached to a vertical spindle 18 and surrounded by an index-head 19, also attached to the spindle. The spindle has further secured thereto, the inner end of a spiral spring 20, the outer end of which is secured to some fixed point, which in the present embodiment of the invention is shown to be an angular arm 21. The windwheel 16 is attached to a spindle 22, which, like the spindle 18, is vertically arranged and has pointed extremities revolubly supported in suitable bearings. To the spindle 22 is also attached a gear 23, which, through suitable intermediate gearing as shown, drives the registering shaft of an odometer 24, of suitable construction, the odometer being preferably arranged and secured at the outside of the casing 10 and having the index figures visible from a common and convenient point with those of the index-head 19 of the speedometer, the figures of the latter being observed through an opening 25 on an inclined portion of the casing, which conforms to the conical shape of the indexhead.

From the bottom compartment of chamber 11 lead nozzles 26, which project at an inclination at substantially right-angles to the blades of the wind-wheel 16, and are so arranged with respect to said blades that a blast of air will at all times be in direct action on one of these blades in any position of the wheel. From the intermediate compartment 12, a nozzle 27 leads to the under side of the wind-wheel 17, and inclines similarly to the nozzles 26. A blower comprising a casing 28 and a generating wheel 29 is provided with a trap 30 in its upper portion, having valves 31 opening inwardly at opposite sides, and from said trap leads the outlet of the casing, which is connected to the inlet of the chamber 12 by a flexible pipe or tube 32. At the lower portion of the blower casing is integrally formed or otherwise suitably attached, a clamp 33, which is adapted to be applied to the axle of the vehicle wheel, as best illustrated in Fig. 3. When the appliance is thus applied, a gear wheel 34, of suitable diameter, in fixed relation to the inside of the vehicle wheel, intermeshes with a smaller gear 35 attached to the axis of the generating wheel 29. The meter casing is ordinarily secured at a convenient point at the front of the vehicle, as illustrated in Fig. 1, and since the pipe 32 is of a flexible nature, the blower may swing freely with the steering mechanism.

In operation of the meter, when the vehicle is driven a blast of air will be sent through the pipe 32, irrespective of the direction in which the vehicle is moving, this obviously being effected by the trap 30. The blast of air from the blower will first pass from the air chamber in the meter, through the nozzles 26, causing the windwheel 16 to rotate at a velocity proportionate to the rate of travel, and thus actuate the speedometer through the intermediate gearing. The air then passes through the nozzle 27 and impinges on the windwheel 17, causing the rotation of the spindle 18 against the tension of the spring 20, the amount of this rotation depending of course on the force of the air blast from the nozzle, which in turn is dependent upon the speed of the vehicle. The air, after performing its work on the windwheel 17, may ordinarily escape from the casing through the joints and the bearings of the odometer 24, without requiring any special openings in the casing for this purpose. The meter may be adjusted after it is applied to a vehicle or car to correctly indicate the speed and the distance traveled, by adjusting the valve 15, which operates to more or less relieve the pressure in the air chamber 11.

Having thus described my invention, I claim as new and desire to secure by Letters Patent:

1. The combination of a blower having a trap provided with outlet valves at opposite sides thereof, a meter actuated by a current of air, and a conduit leading from the trap of the blower to the meter.

2. The combination of an odometer and a speedometer, means for actuating the odometer and speedometer, including windwheels arranged in separate compartments, and means for delivering a current of air from one of said windwheels to the other.

3. The combination of a casing divided into a plurality of compartments, an odometer having an actuating windwheel located in one of said compartments, a speedometer having an actuating windwheel located in another of said compartments, and means for directing a current of air on one of said windwheels and thence on the other windwheel.

4. The combination of a casing divided into three compartments, one of which serves as an air chamber, an odometer, means for actuating the odometer, including a windwheel, located in another of said compartments, a speedometer arranged in a third compartment, having an actuating windwheel, a nozzle for directing the air from the air chamber to the windwheel of the odometer, and a nozzle for directing the air from the second compartment to the windwheel of the speedometer.

In testimony whereof I have signed my name to this specification in the presence of two subscribing witnesses.

ROBERT G. SANFORD.

Witnesses:
  W. W. HOLT,
  H. D. LLOYD.